US012602656B2

(12) United States Patent
Liu

(10) Patent No.: US 12,602,656 B2
(45) Date of Patent: Apr. 14, 2026

(54) REAL-TIME VEHICULAR GOODS INVENTORY-TAKING SYSTEM BASED ON RADIO FREQUENCY IDENTIFICATION TECHNOLOGY

(71) Applicant: THE THIRD RESEARCH INSTITUTE OF MINISTRY OF PUBLIC SECURITY, Shanghai (CN)

(72) Inventor: Caixia Liu, Shanghai (CN)

(73) Assignee: THE THIRD RESEARCH INSTITUTE OF MINISTRY OF PUBLIC SECURITY (CN)

( * ) Notice: Subject to any disclaimer, the term of this patent is extended or adjusted under 35 U.S.C. 154(b) by 19 days.

(21) Appl. No.: 18/723,706

(22) PCT Filed: Nov. 4, 2022

(86) PCT No.: PCT/CN2022/129865
§ 371 (c)(1),
(2) Date: Jun. 24, 2024

(87) PCT Pub. No.: WO2023/236430
PCT Pub. Date: Dec. 14, 2023

(65) Prior Publication Data
US 2025/0061417 A1      Feb. 20, 2025

(30) Foreign Application Priority Data
Jun. 7, 2022      (CN) .......................... 202210642180.8

(51) Int. Cl.
*G06Q 10/087*      (2023.01)
*B60Q 9/00*      (2006.01)
(Continued)

(52) U.S. Cl.
CPC ............. *G06Q 10/087* (2013.01); *B60Q 9/00* (2013.01); *G06K 19/0776* (2013.01); *G06Q 10/0832* (2013.01)

(58) Field of Classification Search
CPC .. G06Q 10/087; G06Q 10/0832; G06Q 10/08; G06Q 10/083; B60Q 9/00;
(Continued)

(56) References Cited

U.S. PATENT DOCUMENTS 9,665,848 B1 *    5/2017   Johnson ............. G08B 13/2417
2003/0222141 A1 *  12/2003   Vogler ................ G06Q 10/087
                                            235/385
2019/0178701 A1     6/2019   Hall et al.

FOREIGN PATENT DOCUMENTS

CN          104950830          9/2015
CN          107392521          11/2017
(Continued)

OTHER PUBLICATIONS

Liu, Caixia; International Search Report and Written Opinion for PCT/CN2022/129865, filed Nov. 4, 2022, mailed Feb. 8, 2023, 12 pages.

*Primary Examiner* — Garcia Ade
(74) *Attorney, Agent, or Firm* — Taylor Duma LLP

(57) ABSTRACT
The present invention discloses a vehicle goods real-time inventory system based on radio frequency identification technology. The system includes an automatic goods inventory unit, a vehicle gateway unit, an alarm prompt unit, and a remote management unit. Through the automatic goods inventory unit, the system registers quantity changes during loading and unloading of goods in real time, performs quantity inventory on transported goods regularly or irregularly, and transmits registration and inventory information to the vehicle gateway unit or directly to the remote management unit through the vehicle gateway unit. The system
(Continued)

provided in the present invention can register quantity changes during loading and unloading of goods in real time, and perform quantity inventory on transported goods regularly or irregularly. On this basis, the system can comprehensively determine whether goods on a freight vehicle are at risk of being lost.

8 Claims, 3 Drawing Sheets

(51) Int. Cl.
 *G06K 19/077* (2006.01)
 *G06Q 10/0832* (2023.01)
(58) Field of Classification Search
 CPC .. G06K 19/0776; G06K 7/10009; G08B 7/06;
 G08B 21/24; G08B 25/08
 See application file for complete search history.

(56) References Cited

FOREIGN PATENT DOCUMENTS

| | | | |
|---|---|---|---|
| CN | 107609808 | 1/2018 | |
| CN | 114819859 | 7/2022 | |
| WO | WO-2021074693 A1 * | 4/2021 | ............. G05D 1/667 |

* cited by examiner

REAL-TIME VEHICULAR GOODS INVENTORY-TAKING SYSTEM BASED ON RADIO FREQUENCY IDENTIFICATION TECHNOLOGY

CROSS-REFERENCE TO RELATED APPLICATIONS

The present application is a National Stage application of PCT international application: PCT/CN2022/129865, filed on 4 Nov. 2022, the disclosure of which is hereby incorporated by reference in its entirety.

TECHNICAL FIELD

The present invention relates to vehicle safety technology, and specifically, to vehicle goods safety prevention and control technology.

BACKGROUND

A freight vehicle is a vehicle designed and equipped mainly for transporting goods. The existing safety monitoring of freight vehicles for transporting goods mainly focuses on the monitoring of vehicle operating statuses, such as vehicle speed and positioning; and the transported goods cannot be effectively monitored. As a result, when the transported goods of the freight vehicle are lost, the goods often cannot be found in time, resulting in irreparable losses. Especially, when freight vehicles transport dangerous goods such as flammable, explosive, highly corrosive, toxic and radioactive goods, once the vehicle goods are scattered, stolen or lost, the goods are easily used by criminals for terrorist criminal activities or be picked up by uninformed people and used improperly. If the goods cannot be found in time and stopped as soon as possible, it will bring major safety hazards to the society and cause great harm to the life safety and health of the people.

Therefore, how to perform effective safety monitoring on vehicle goods during transportation to ensure the safety of freight vehicle transportation is an urgent problem that needs to be resolved in this field.

SUMMARY

For the existing problem in the safety supervision of freight vehicles, especially vehicle goods, a solution that can perform comprehensive and safe monitoring on transported goods of the freight vehicles is needed.

In view of this, an objective of the present invention is to provide a vehicle goods real-time inventory system based on radio frequency identification technology. The system can perform real-time inventory on vehicle goods on a freight vehicle during transportation, to effectively monitor the safety of the vehicle goods, thereby effectively improving the safety of freight vehicle transportation.

In order to achieve the above objective, the vehicle goods real-time inventory system based on radio frequency identification technology provided in the present invention includes:

an automatic goods inventory unit, where the automatic goods inventory unit is configured for real-time registration on quantity changes during loading and unloading of goods, perform quantity inventory on transported goods regularly or irregularly, and transmit registration and inventory information to a vehicle gateway unit or directly to a remote management unit through the vehicle gateway unit;

the vehicle gateway unit, where the vehicle gateway unit is respectively associated with the automatic goods inventory unit, the alarm prompt unit, and the remote management unit, and establishes a communication channel between the units to complete data exchange; the vehicle gateway unit can complete risk early warning processing according to the corresponding registration and inventory information in cooperation with the automatic goods inventory unit;

the alarm prompt unit, where the alarm prompt unit is connected to the vehicle gateway unit, and can complete a local alarm on a vehicle and/or complete a remote alarm by associating with the remote management unit through the vehicle gateway unit; and the remote management unit, where the remote management unit is associated with the vehicle gateway unit, and indirectly associated with the automatic goods inventory unit and the alarm prompt unit through the vehicle gateway unit; and the remote management unit can generate system configuration information and/or emergency handling information; and can also receive vehicle goods inventory early warning information sent by the vehicle gateway unit.

Further, the automatic goods inventory unit includes a radio frequency identification card reader disposed at a carriage door of a radio frequency identification electronic tag disposed on goods packaging;

the radio frequency identification card reader is configured to read the radio frequency identification electronic tag on the goods packaging; and the radio frequency identification electronic tag is pasted on the goods packaging for reading statistics during the loading and unloading of the goods and for real-time inventory statistics during transportation of the goods.

Further, the vehicle gateway unit includes a network communication module and/or a data storage module and/or an edge computing module;

the network communication module is configured for data exchange between the automatic goods inventory unit and the alarm prompt unit and between the automatic goods inventory unit and the remote management unit;

the data storage module is configured to store goods registration and inventory information uploaded by the automatic goods inventory unit; and the edge computing module is configured for intelligent analysis and determination on the goods registration and inventory information uploaded by the automatic goods inventory unit.

Further, the vehicle gateway unit is directly associated with the automatic goods inventory unit, the alarm prompt unit, and the remote management unit;

when the vehicle gateway unit receives the goods registration and inventory information uploaded by the automatic goods inventory unit and determines through analysis that when a related early warning alarm is triggered, the vehicle gateway unit sends warning information to the alarm prompt unit and sends early warning and alarm information and real-time goods registration and inventory information to the remote management unit; and when receiving an alarm instruction, a voice prompt instruction, or a detector configuration adjustment sent by the remote management unit, the vehicle gateway unit sends alarm instruction and voice prompt instruction information to the alarm prompt unit, and sends a related configuration operation to the radio frequency identification card reader of the automatic goods inventory unit.

Further, the alarm prompt unit includes a vehicle local alarm prompt subunit and a remote monitoring client alarm prompt subunit.

Further, the remote management unit includes a government industry management client, an enterprise operation management client, a driver and passenger service client, and a communication center;

the government industry management client is configured to receive and display vehicle goods inventory monitoring and early warning information forwarded by the automatic goods inventory unit of a vehicle transporting flammable, explosive, highly corrosive, toxic and radioactive dangerous goods through the vehicle gateway unit and the communication center, and based on the received early warning and alarm information, send a related management instruction, start an emergency management process, and issue a related emergency handling instruction;

the enterprise operation management client is configured to receive and display vehicle goods inventory monitoring and early warning information forwarded by the automatic goods inventory unit through the vehicle gateway unit and the communication center, and send a related management instruction or emergency rescue guide information based on the received early warning and alarm information; and when the vehicle transports dangerous goods such as flammable, explosive, highly corrosive, toxic and radioactive goods, or other goods that may pose a safety hazard (such as virus samples), send emergency alarm information synchronously to the government industry management client;

the driver and passenger service client is configured to receive and display vehicle goods inventory monitoring and early warning information forwarded by the automatic goods inventory unit through the vehicle gateway unit and the communication center, send an acousto-optic alarm, a voice prompt, and emergency handling information corresponding to the alarm warning information based on the received alarm warning information, to prompt a driver to check, and provide a corresponding emergency handling plan; and when the vehicle transports dangerous goods such as flammable, explosive, highly corrosive, toxic and radioactive goods, or other goods that may pose a safety hazard (such as virus samples), send emergency alarm information synchronously to the government industry management client; and the communication center is configured to communicate with the vehicle gateway unit, receive and store the vehicle goods inventory monitoring and early warning information forwarded by the automatic goods inventory unit through the vehicle gateway unit, and forward the information respectively to the government industry management client, the enterprise operation management client, and the driver and passenger service client.

Further, the remote management unit is disposed in a cloud platform of a government industry authority related to vehicle traffic management or operation management and/or a local storage server and/or a personal handheld smart terminal of a related manager, a cloud platform of a vehicle-owned transportation enterprise and a transportation related party and/or a local storage server and/or a personal handheld smart terminal of a related manager, and a personal handheld smart terminal of a driver or a passenger, and is associated with the vehicle gateway unit, and indirectly associated with the automatic goods inventory unit and the alarm prompt unit through the vehicle gateway unit.

The vehicle goods real-time inventory system based on radio frequency identification technology provided in the present invention can register quantity changes during loading and unloading of goods, and perform quantity inventory on transported goods regularly or irregularly. On this basis, the system can comprehensively determine whether goods on a freight vehicle are at risk of being stolen or lost. When a detection result or an intelligent analysis result of a monitored object triggers an early warning or alarm, early warning or alarm information is sent to the remote management unit through the network communication module of the vehicle gateway, and a corresponding local early warning acousto-optic or voice prompt is sent through the alarm prompt unit to prompt a driver to stop and check.

BRIEF DESCRIPTION OF THE DRAWINGS

The present invention is further described below with reference to the accompanying drawings and specific embodiments.

DETAILED DESCRIPTION

In order to make the technical means, creative features, objectives and effects of the present invention easy to understand, the present invention is further described below with reference to specific drawings.

For the existing problem that during goods transporting of freight vehicles, there is a large safety risk in effective safety monitoring of quantity changes in goods during loading and unloading, the quantity changes in vehicle goods during transporting need to be monitored accurately, to ensure the safety of the entire goods transporting process. In view of this, this embodiment provides a vehicle goods real-time inventory system that enables real-time inventory on vehicle goods during transportation of the goods.

The vehicle goods real-time inventory system in this embodiment registers quantity changes during loading and unloading of goods in real time based on the radio frequency identification technology, performs quantity inventory on transported goods regularly or irregularly, comprehensively determines whether the vehicle and the vehicle goods are at risk of being stolen or lost, and when a detection result or an intelligent analysis result of a monitored object triggers an early warning or alarm, sends early warning or alarm information to the remote management unit through the network communication module of the vehicle gateway, and sends a corresponding local early warning acousto-optic or voice prompt through the alarm prompt unit to prompt a driver to check.

It should be noted herein that the freight vehicles in the present invention are all freight vehicles with carriages, such as green pass vehicles, ordinary freight vehicles, express logistics vehicles, and train freight vehicles.

Figure 1:
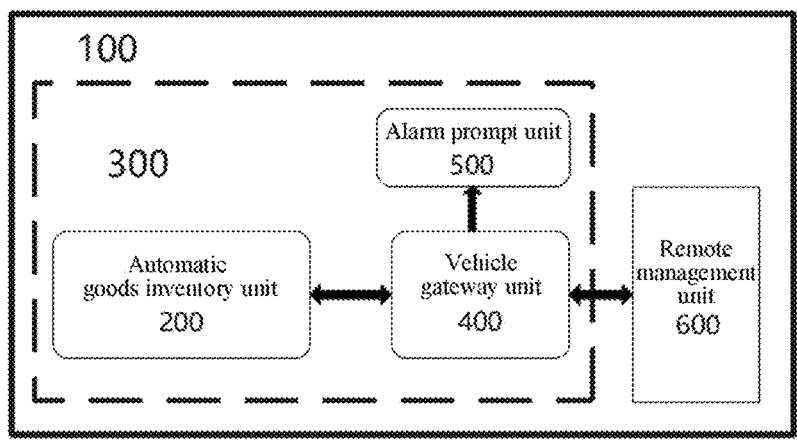
FIG. 1 is a schematic diagram of an overall composition principle of a vehicle goods real-time inventory system based on radio frequency identification technology according to an embodiment of the present invention.

FIG. 1 is a schematic diagram of an overall composition principle of a vehicle goods real-time inventory system based on radio frequency identification technology in this embodiment.

Based on FIG. 1, the vehicle goods real-time inventory system 100 in this embodiment is mainly composed of an automatic goods inventory unit 200, a vehicle gateway unit 400, an alarm prompt unit 500, and a remote management unit 600 that cooperate with each other.

Based on FIG. 1, the automatic goods inventory unit 200 in the system is disposed inside a carriage or at a carriage door of the freight vehicle 300, and on goods packaging, is associated with the vehicle gateway unit 400, and is associated with the alarm prompt unit 500 and the remote management unit 600 through the vehicle gateway unit 400.

Figure 2:
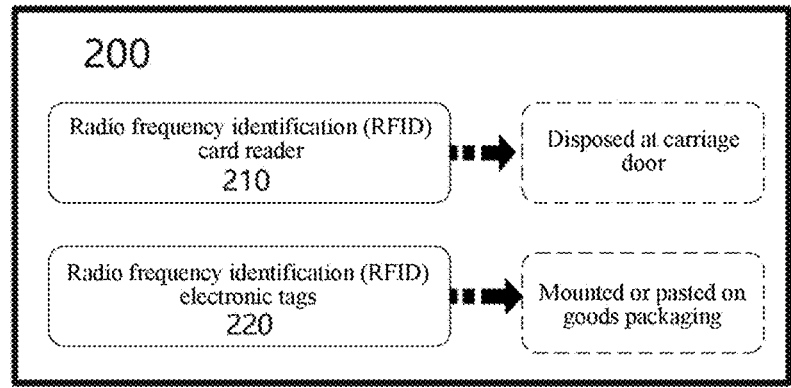
FIG. 2 is a schematic composition diagram of an automatic goods inventory unit according to an embodiment of the present invention.

FIG. 2 is a schematic composition diagram of an automatic goods inventory unit of a vehicle goods real-time inventory system based on radio frequency identification technology in this embodiment.

Based on FIG. 2, the automatic goods inventory unit 200 in the system is composed of a radio frequency identification (RFID) card reader 210 disposed at a carriage door and several radio frequency identification (RFID) electronic tags 220 mounted or pasted on goods packaging.

Based on FIG. 1 and FIG. 2, during loading and unloading of goods, the radio frequency identification (RFDI) card reader 2102 reads or batch reads radio frequency identification (RFDI) electronic tags on packaging of goods passing by a carriage door of a van, and automatically counts the actual loaded goods quantity and quantity changes according to reading results, so that a loader can compare and check waybill information; During transportation, the radio frequency identification (RFDI) card reader 210 automatically reads all the radio frequency identification (RFDI) electronic tags 220 on the goods packaging according to a time cycle set by the remote management unit or a read command for real-time inventory; and automatically determines differences and changes of the actual goods quantity and the loaded goods quantity according to reading results, so that the driver and passenger can find the theft or loss of the goods in time.

Therefore, the automatic goods inventory unit 200 realizes real-time registration on quantity changes during loading and unloading of internal goods of an enclosed van transporting the goods, and periodic or irregular quantity inventory on the transported goods.

Figure 3:
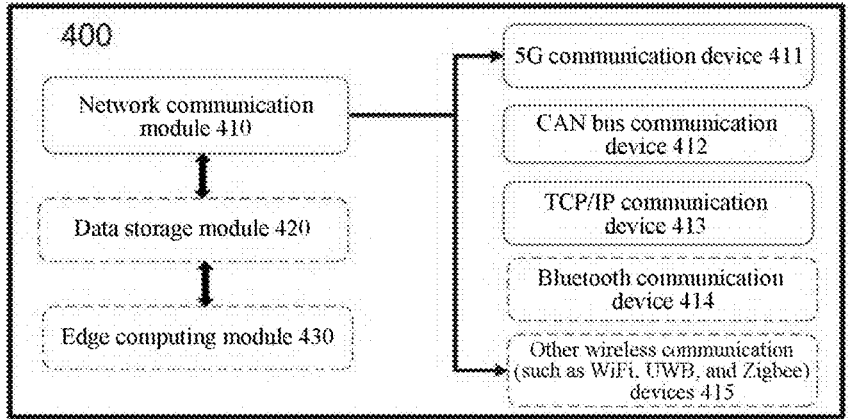
FIG. 3 is a schematic diagram of a composition principle of a vehicle gateway unit and a network communication module thereof according to an embodiment of the present invention.

For the convenience of expression, a basic composition scheme of the vehicle gateway unit 400 in this embodiment is described herein. FIG. 3 is a schematic diagram of a composition principle of a vehicle gateway unit and a network communication module thereof according to an embodiment of the present invention. Based on FIG. 3, the vehicle gateway unit 400 of the vehicle goods real-time inventory system 100 in this embodiment is mainly composed of a network communication module 410, a data storage module 420, and an edge computing module 430 that cooperate with each other.

On this basis, the automatic goods inventory unit 200 in this embodiment is configured to register quantity changes during loading and unloading of goods in real time, perform quantity inventory on transported goods periodically or irregularly, and transmit registration and inventory information to the data storage module and the edge computing module of the vehicle gateway unit, or to the remote management unit through the network communication module of the vehicle gateway unit.

In addition, the automatic goods inventory unit 200 can further upload real-time inventory results to the data storage module 420 of the vehicle gateway unit 400 through the network communication module 410 of the vehicle gateway unit 400, perform intelligent analysis through the edge computing module 430 of the vehicle gateway unit 400, send early warning information when an intelligent analysis result of a monitored object triggers an early warning or alarm, and when an early warning is triggered, send a local early warning acousto-optic or voice prompt through the alarm prompt unit 500 while sending early warning information to the remote management unit 600 through the network communication module 410 of the vehicle gateway unit 400.

Based on FIG. 1, the vehicle gateway unit 400 in the system is disposed in the cab of the freight vehicle 300 and is respectively associated with the automatic goods inventory unit 200, the alarm prompt unit 500, and the remote management unit 600.

The vehicle gateway unit 400 has at least a network communication function, a data storage function, and an edge computing function. The vehicle gateway unit 400 can establish a communication channel with the remote management unit 600 to analyze inventory data information generated by the automatic goods inventory unit, send alarm information to the remote management unit and the alarm prompt unit respectively when an analysis result triggers an alarm, and send a management instruction such as an inventory time setting adjustment of the remote management unit to the automatic goods inventory unit.

FIG. 3 is a schematic diagram of a composition principle of the vehicle gateway unit 400 of the vehicle goods real-time inventory system and a network communication module in this embodiment.

Based on FIG. 3, the vehicle gateway unit 400 in this embodiment is composed of a network communication module 410, a data storage module 420, and an edge computing module 430 in combination with each other.

The network communication module 410 herein is configured for data exchange between the automatic goods inventory unit and the alarm prompt unit and between the automatic goods inventory unit and the remote management unit, and to forward the inventory results uploaded by the automatic goods inventory unit to the remote management unit, or forward alarm instruction and voice prompt instruction information to the alarm prompt unit according to the received instruction of the remote management unit.

The data storage module 420 herein is configured to store inventory information uploaded by the automatic goods inventory unit.

The edge computing module 430 herein is configured for intelligent analysis and determination of the inventory information uploaded by the automatic goods inventory unit.

Based on FIG. 1 and FIG. 3, the vehicle gateway unit 400 disposed in this way communicates and exchanges data with the automatic goods inventory unit 200 through the network communication module 410, realizes information exchange with the alarm prompt unit 500 and the remote management unit 600, aggregates and stores the inventory data of the automatic goods inventory unit 200 through the data storage module 420, and performs intelligent analysis on various types of inventory data through the edge computing module 430.

When the vehicle gateway unit 400 receives the inventory data of the automatic goods inventory unit 200 and determines through analysis that when a related early warning alarm is triggered, the vehicle gateway unit 400 sends an acousto-optic alarm or voice prompt information to the alarm prompt unit 500 and sends early warning and alarm information and real-time inventory information to the remote management unit 600;

When receiving an alarm instruction, a voice prompt instruction, or an alarm threshold setting adjustment sent by the remote management unit 600, the vehicle gateway unit 400 sends alarm instruction and voice prompt instruction information to the alarm prompt unit 500.

Based on FIG. 1, the alarm prompt unit 500 in the system has a vehicle local alarm prompt sub-unit and a remote monitoring client alarm prompt sub-unit. The vehicle local alarm prompt sub-unit (such as a local acousto-optic alarm or a voice prompt device) is disposed in the cab of the freight vehicle 300 and is connected to the vehicle gateway unit 400. The remote monitoring client alarm prompt sub-unit is disposed in the government industry management client, the enterprise operation management client, and the driver and passenger service client of the remote management unit 600, and is connected to the vehicle gateway unit 400.

The vehicle local alarm prompt sub-unit in the alarm prompt unit 500 can send a voice prompt or an acousto-optic alarm based on a monitoring analysis result sent by the vehicle gateway unit. The remote monitoring client alarm prompt sub-unit in the alarm prompt unit 500 can send a voice or text prompt based on the monitoring analysis result sent by the vehicle gateway unit.

Figure 4:
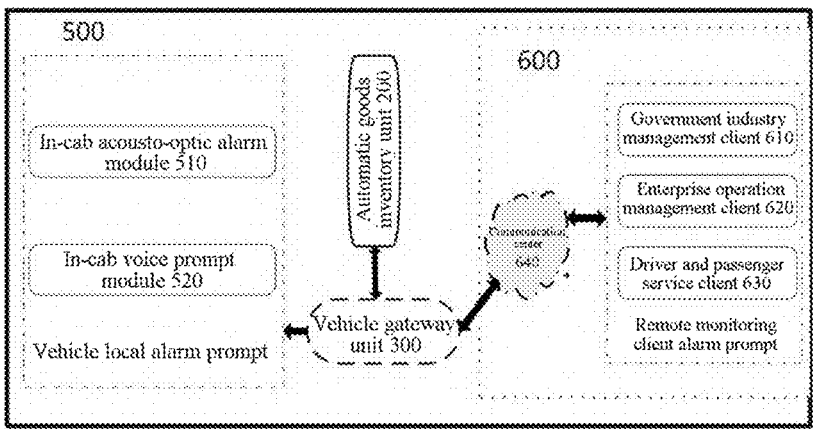
FIG. 4 is a schematic diagram of a composition principle and a use procedure of an alarm prompt unit according to an embodiment of the present invention.

FIG. 4 is a schematic diagram of a composition principle and a use procedure of the alarm prompt unit 500 of the vehicle goods real-time inventory system in this embodiment.

Based on FIG. 4, the alarm prompt unit 500 in this embodiment is composed of the vehicle local alarm prompt sub-unit such as an in-cab acousto-optic alarm module 510 or an in-cab voice prompt module 520, and the remote monitoring client alarm prompt sub-unit such as the government industry management client 610, the enterprise operation management client 620, and the driver and passenger service client 630 that cooperate with each other.

The in-cab acousto-optic alarm module 510 is configured to send an acousto-optic alarm when receiving vehicle goods inventory early warning information. For example, light emitted by the acousto-optic alarm of the acousto-optic alarm module is generally red by default.

The in-cab voice prompt module 520 is configured to send a voice prompt when receiving vehicle goods inventory information, and prompt the driver to stop and check immediately. For example, the in-cab voice prompt module and the in-cab acousto-optic alarm module can be disposed independently or combined into a voice acousto-optic alarm.

The government industry management client 610 is configured to receive alarm information from the vehicle gateway through the communication center when vehicle goods inventory early warning information appears in the vehicle transporting dangerous goods such as flammable, explosive, highly corrosive, toxic and radioactive goods. For example, when receiving vehicle goods inventory monitoring and early warning information, the government industry management client starts an emergency management process by default according to an emergency plan.

The enterprise operation management client 620 is configured to receive the alarm information forwarded by the vehicle gateway through the communication center when the vehicle goods inventory monitoring and early warning information appears. For example, when receiving goods inventory monitoring and early warning information, the operation management client starts an emergency management process by default according to an emergency plan, and sends emergency alarm information synchronously to the government industry management client when the vehicle transports dangerous goods such as flammable, explosive, highly corrosive, toxic and radioactive goods, or other goods that may pose a safety hazard (such as virus samples).

The driver and passenger service client 630 is configured to receive the alarm information forwarded by the vehicle gateway through the communication center when the vehicle goods inventory monitoring and early warning information appears. For example, the driver and passenger service client sends a voice prompt while sending the alarm information. When the vehicle transports dangerous goods such as flammable, explosive, highly corrosive, toxic and radioactive goods, or other goods that may pose a safety hazard (such as virus samples), emergency alarm information is synchronously sent to the government industry management client.

Based on FIG. 1 and FIG. 4, the alarm prompt unit 500 disposed in this way can be configured to send an acousto-optic alarm through the in-cab acousto-optic alarm module 510 when receiving the vehicle goods inventory early warning information sent by the automatic goods inventory unit 200;

The in-cab voice prompt module 520 can be configured to send a voice prompt to prompt the driver to check when receiving the goods inventory monitoring and early warning information sent by the automatic goods inventory unit 200.

The alarm prompt unit 500 disposed in this way can further receive, through the government industry management client, alarm information on theft or loss of vehicle goods of a vehicle transporting dangerous goods such as flammable, explosive, strongly corrosive, toxic, and radioactive goods forwarded by the vehicle gateway unit 400 through the communication center 610; and can receive, through the enterprise operation management client 620, alarm information on theft or loss of vehicle goods forwarded by the vehicle gateway unit 400 through the communication center. The enterprise operation management client starts the emergency management process by default according to the emergency plan when receiving information on theft or loss of the vehicle goods, and sends emergency alarm information synchronously to the government industry management client 610 when receiving an alarm on theft or loss of the vehicle goods of the vehicle transporting dangerous goods such as flammable, explosive, highly corrosive, toxic and radioactive goods; and can receive, through the driver and passenger service client 630, the alarm information on theft or loss of the vehicle goods forwarded by the vehicle gateway unit 400 through the communication center. The driver and passenger service client sends a voice prompt while sending the alarm information. When an alarm on theft or loss of vehicle goods of the vehicle transporting dangerous goods such as flammable, explosive, highly corrosive, toxic and radioactive goods is received, emergency alarm information is synchronously sent to the government industry management client 610.

Based on FIG. 1, the remote management unit 600 in the system is disposed a cloud platform of a government industry authority related to vehicle transportation and/or a local storage server and/or a personal handheld smart terminal of related manager, a cloud platform of a vehicle-owned transportation enterprise and a transportation related party and/or a local storage server and/or a personal handheld smart terminal of a related manager, and a personal handheld smart terminal of a driver or a passenger, and is directly associated with the vehicle gateway unit 400, and indirectly associated with t the automatic goods inventory unit 200 and the alarm prompt unit 500 through the vehicle gateway unit 400.

The remote management unit 600 can send instructions to set and adjust the reading cycle and reading time of the radio frequency identification (RFDI) card reader in the automatic goods inventory unit 200, and receive the vehicle goods inventory monitoring and early warning information sent by the vehicle gateway unit.

Figure 5:
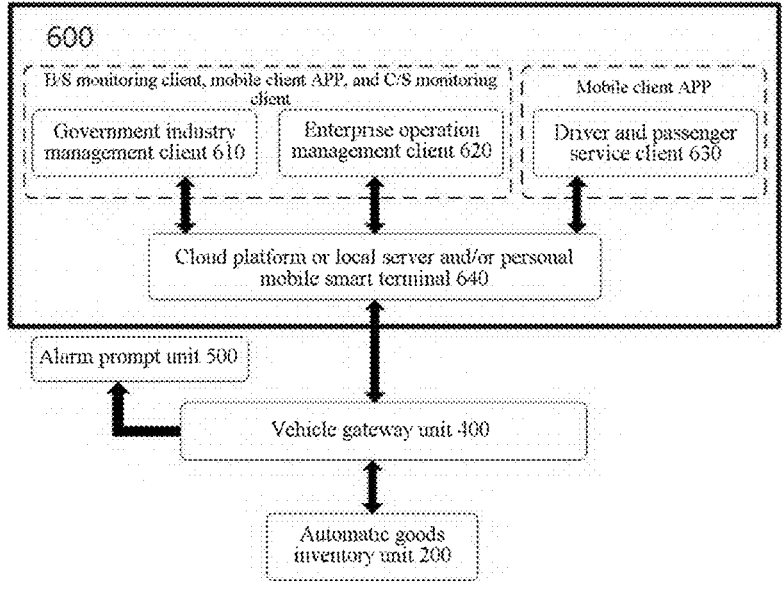
FIG. 5 is a schematic diagram of a composition principle and a use procedure of a remote management unit according to an embodiment of the present invention.

FIG. 5 is a schematic diagram of a composition principle and a use procedure of the remote management unit 600 of the vehicle goods real-time inventory system in this embodiment.

Based on FIG. 5, the remote management unit 600 in this embodiment is composed of a government industry management client 610, an enterprise operation management client 620, a driver and passenger service client 630, and a communication center (cloud platform or local server and/or personal mobile smart terminal) 640 that cooperate with each other.

The government industry management client 610 in the remote management unit 600 is configured to receive and display alarm information on theft or loss of vehicle goods of the vehicle transporting dangerous goods such as flammable, explosive, highly corrosive, toxic and radioactive goods forwarded by the automatic goods inventory unit through the vehicle gateway unit and the communication center, and based on the received early warning and alarm information, send a related management instruction, start an emergency management process, and issue a related emergency handling instruction.

The enterprise operation management client 620 in the remote management unit 600 is configured to receive and display vehicle goods inventory monitoring and early warning information forwarded by the automatic goods inventory unit through the vehicle gateway unit and the communication center, and send a related management instruction based on the received early warning and alarm information. When the vehicle goods inventory monitoring and early warning information is received, the emergency management process is started, and when the alarm on theft or loss of the vehicle goods of the vehicle transporting dangerous goods such as flammable, explosive, highly corrosive, toxic and radioactive goods is received, an emergency alarm is sent to the government industry management client and a related emergency handling instruction is issued.

The driver and passenger service client 630 in the remote management unit 600 is configured to receive and display vehicle goods inventory monitoring and early warning information forwarded by the automatic goods inventory unit through the vehicle gateway unit and the communication center, send an acousto-optic alarm and a voice prompt based on the received alarm warning information, to prompt a driver to check. When the alarm on theft or loss of vehicle goods of the vehicle transporting dangerous goods such as flammable, explosive, highly corrosive, toxic and radioactive goods, an emergency alarm is sent to the government industry management client.

The communication center 640 in the remote management unit 600 is configured to communicate with the vehicle gateway unit, receive and store the vehicle goods inventory monitoring and early warning information forwarded by the automatic goods inventory unit through the vehicle gateway unit, and forward the information respectively to the government industry management client, the enterprise operation management client, and the driver and passenger service client. The communication center also serves as a computer system environment for the government industry management client, the enterprise operation management client, and the driver and passenger service client to supports related software applications, and transmits management instructions or response instructions of the government industry management client, the enterprise operation management client, and the driver and passenger service client to the vehicle gateway unit.

Based on FIG. 1 and FIG. 5, the remote management unit 600 disposed in this way can receive and display, through the government industry management client 610, alarm information on theft or loss of the vehicle goods of the vehicle transporting dangerous goods such as flammable, explosive, strongly corrosive, toxic, and radioactive goods forwarded by the automatic goods inventory unit 200 through the vehicle gateway unit 300 and the communication center 640, and based on the received early warning and alarm information, send a related management instruction, start an emergency management process, and issue a related emergency handling instruction; and can receive and display, through the enterprise operation management client 620, vehicle goods inventory monitoring and early warning information forwarded by the automatic goods inventory unit 200 through the vehicle gateway unit 300 and the communication center 640, and send a related management instruction based on the received early warning and alarm information. When the vehicle goods inventory monitoring and early warning information is received, the emergency management process is started, and when the alarm on theft or loss of the vehicle goods of the vehicle transporting dangerous goods such as flammable, explosive, highly corrosive, toxic and radioactive goods is received, an emergency alarm is sent to the government industry management client 610 and a related emergency handling instruction is issued.

The remote management unit 600 can receive and display, through the driver and passenger service client 630, vehicle goods inventory monitoring and early warning information forwarded by the automatic goods inventory unit 200 through the vehicle gateway unit 300) and the communication center 640), and send an acousto-optic alarm and a voice prompt based on the received alarm warning information. When the alarm on theft or loss of the vehicle goods of the vehicle transporting dangerous goods such as flammable, explosive, highly corrosive, toxic and radioactive goods is received, an emergency alarm is sent to the government industry management client 610.

The remote management unit 600 can communicate with the vehicle gateway unit 300 through the communication center 640, receive and store the vehicle goods inventory monitoring and early warning information forwarded by the automatic goods inventory unit 200 through the vehicle gateway unit 400, and forward the information respectively to the government industry management client 610, the enterprise operation management client 620, and the driver and passenger service client 630. The communication center 640 also serves as a computer system environment for the government industry management client 610, the enterprise operation management client 620, and the driver and passenger service client 630 to support related software applications, and transmits management instructions or response instructions of the government industry management client 610, the enterprise operation management client 620, and the driver and passenger service client 630 to the vehicle gateway unit 400.

Accordingly, the vehicle goods real-time inventory system 100 can register quantity changes during loading and unloading of goods in real time through the automatic goods inventory unit 200, perform quantity inventory on transported goods regularly or irregularly, and send early warning information when an inventory result or intelligent analysis result of a monitored object triggers an early warning or alarm.

The vehicle gateway unit 400 in the system communicates and exchanges data with the automatic goods inventory unit through the network communication module, realizes information exchange with the alarm prompt unit and the remote management unit, aggregates and stores inventory data of the automatic goods inventory unit through the data storage module, and performs intelligent analysis on the inventory data of the automatic goods inventory unit through the edge computing module. When the intelligent analysis result of the inventory data triggers an early warning or alarm, the vehicle gateway unit sends the early warning or alarm information respectively to the alarm prompt unit and the remote management unit through the network communication module, and the alarm prompt unit sends a local in-cab acousto-optic alarm or voice prompt through the in-cab acousto-optic alarm module and/or voice alarm module and/or the remote alarm warning module. The remote management unit can display the alarm warning result or set a related sensor early warning alarm threshold through the government industry management client, the enterprise operation management client and the driver and passenger service client respectively.

On this basis, this embodiment further specifies the specific devices that may be involved in the composition modules of the units of the vehicle goods real-time inventory system, and illustrates a feasible deployment scheme of the corresponding unit modules.

FIG. 3 further shows a schematic composition scheme of the network communication module 410 in the vehicle gateway unit 400 of the vehicle goods real-time inventory system.

Based on FIG. 3, the network communication module 410 of the vehicle gateway unit 400 in this embodiment includes but is not limited to a 5G communication device 411, a CAN bus communication device 412, a TCP/IP communication device 413, a Bluetooth communication device 414, other wireless communication (such as WIFI, UWB, and Zigbee) devices 415, and the like.

The 5G communication device 411 is configured for communication between the vehicle gateway and the remote management unit.

The CAN bus communication device 412 is configured for wired communication in CAN bus mode between the vehicle gateway and the automatic goods inventory unit and between the vehicle gateway and the alarm prompt unit.

The TCP/IP communication device 413 is configured for wired communication or wireless communication in TCP/IP mode between the vehicle gateway and the automatic goods inventory unit, the alarm prompt unit, and the remote management unit.

The Bluetooth communication device 414 is configured for wireless communication based on the Bluetooth protocol between the vehicle gateway and the automatic goods inventory unit and between the vehicle gateway and the alarm prompt unit.

The other wireless communication (such as WIFI, UWB, and Zigbee) devices 415 are configured for wireless communication based on corresponding protocols such as WIFI, UWB, and Zigbee between the vehicle gateway and the automatic goods inventory unit and between the vehicle gateway and the alarm prompt unit.

Based on FIG. 1 and FIG. 3, the network communication module 410 disposed in this way can perform communication between the vehicle gateway unit 400 and the remote management unit 600 through the 5G communication device 411;

can perform communication in CAN bus mode between the vehicle gateway unit 400 and the automatic goods inventory unit 200 and between the vehicle gateway unit 400 and the alarm prompt unit 500 through the CAN bus communication device 412;

can perform wired or wireless communication in TCP/IP mode between the vehicle gateway unit 400 and the automatic goods inventory unit 200, the alarm prompt unit 500, and the remote management unit 600 through the TCP/IP communication device 413;

can perform wireless communication based on the Bluetooth protocol between the vehicle gateway unit 400 and the automatic goods inventory unit 200 and between the vehicle gateway unit 400 and the alarm prompt unit 400 through the Bluetooth communication device 414; and can perform wireless communication based on corresponding protocols such as WIFI, UWB, and Zigbee between the vehicle gateway unit 400 and the automatic goods inventory unit 200 and between the vehicle gateway unit 400 and the alarm prompt unit 500 through the other wireless communication (such as WIFI, UWB, and Zigbee) devices 415.

Referring to FIG. 3, this embodiment further shows a schematic composition scheme of the data storage module 420 in the vehicle gateway unit 400 of the vehicle goods real-time inventory system.

In this embodiment, the data storage module 420 preferably includes a built-in data storage device and an external data storage device.

The built-in data storage device includes, but is not limited to, a built-in static random access memory (SRAM), a built-in dynamic random access memory (DRAM), and a built-in hard disk; and the external data storage device includes, but is not limited to, an external removable hard disk, a USB flash drive, a TF memory card, and an SD memory card.

In this embodiment, both the built-in data storage device and the external data storage device can be configured to store the inventory information uploaded by the automatic goods inventory unit.

Referring to FIG. 3, this embodiment further shows a schematic composition scheme of the edge computing module 430 in the vehicle gateway unit 400 of the vehicle goods real-time inventory system.

Specifically, the edge computing module 430 of the vehicle gateway unit 400 includes an AI smart chip with an edge computing function and a terminal SDK with an edge computing function.

In this embodiment, the AI intelligent chip of with the edge computing function and the terminal SDK with the edge computing function are configured to perform intelligent analysis and determination on the inventory information uploaded by the automatic goods inventory unit.

During deployment of the vehicle gateway unit 400 configured in this way, he vehicle gateway unit 400 is preferably directly associated with the automatic goods inventory unit 200, the alarm prompt unit 500, and the remote management unit 600.

When the vehicle gateway unit 400 deployed in this way receives the inventory information uploaded by the automatic goods inventory unit and determines through analysis that when a related early warning alarm is triggered, the vehicle gateway unit sends an acousto-optic alarm or voice prompt information to the alarm prompt unit and sends early warning and alarm information and real-time monitoring information to the remote management unit.

When receiving an alarm instruction, voice prompt instruction or alarm threshold setting adjustment sent by the remote management unit, the vehicle gateway sends alarm instruction and voice prompt instruction information to the alarm prompt unit, and sends instruction information such as the alarm threshold setting adjustment and circuit control to a related detection device of the automatic goods inventory unit for related operations such as detector alarm threshold adjustment.

Referring to FIG. 1 and FIG. 4, during deployment of the alarm prompt unit 500 in this embodiment, the alarm prompt unit 500 is preferably directly associated with the vehicle gateway unit 400 and indirectly associated with the automatic goods inventory unit 200 and the remote management unit 600 through the vehicle gateway unit 400.

When the alarm prompt unit 500 deployed in this way cooperates with other units, when the local alarm prompt sub-unit receives medium-risk level or low-risk level vehicle goods inventory monitoring and early warning information sent by the vehicle gateway, the alarm prompt unit sends an in-cab acousto-optic alarm and prompts the driver to check by voice.

When the remote monitoring client alarm prompt sub-unit receives the vehicle goods inventory monitoring and early warning information, the alarm prompt unit sends an alarm prompt.

When the remote monitoring client alarm prompt sub-unit receives the alarm information on theft or loss of the vehicle transporting dangerous goods such as flammable, explosive, highly corrosive, toxic and radioactive goods, the alarm prompt unit sends an emergency alarm and a voice prompt and starts an emergency management process by default according to an emergency plan.

Figure 6:
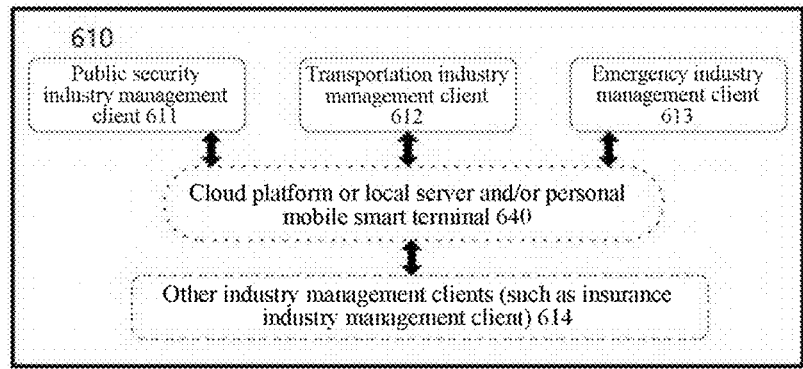
FIG. 6 is a schematic diagram of a composition principle of a government industry management client according to an embodiment of the present invention.

FIG. 6 is a schematic diagram of a composition principle of the government industry management client 610 in the remote management unit 600 of the vehicle goods real-time inventory system in this embodiment.

Based on FIG. 6, the government industry management client 610 of the remote management unit 600 in this embodiment includes a public security industry management client 611, a transportation industry management client 612, an emergency industry management client 613, and other industry management clients (such as an insurance industry management client) 614, and the like according to different competent industry departments.

Based on FIG. 1. FIG. 5, and FIG. 6, the public security industry management client 611 of the government industry management client 610 is configured to receive and display the alarm information on theft or loss of vehicle goods of a vehicle transporting dangerous goods such as flammable, explosive, highly corrosive, toxic, and radioactive goods forwarded by the automatic goods inventory unit 200 through the vehicle gateway unit 400 and the communication center 640, and generate linkage management information according to the information type.

The traffic industry management client 612 of the government industry management client 610 is configured to receive and display the alarm information on theft or loss of vehicle goods of the vehicle transporting dangerous goods such as flammable, explosive, highly corrosive, toxic and radioactive goods forwarded by automatic goods inventory unit 200 through the vehicle gateway unit 400 and the communication center 640, and generate the corresponding linkage management information according to the information type.

The emergency industry management client 613 of the government industry management client 610 is configured to receive and display the alarm information on theft or loss of vehicle goods of the vehicle transporting dangerous goods such as flammable, explosive, toxic and radioactive goods forwarded by the automatic goods inventory unit 200 through the vehicle gateway unit 400 and the communication center 640, and according to the information type and vehicle type, the loaded goods type of the freight vehicle, etc., send an emergency handling instruction to related department personnel and send other linkage management information according to an emergency plan.

The other industry management clients of the government industry management client 610 (such as the insurance industry management client 614) are configured to receive and display vehicle goods inventory monitoring and early warning information forwarded by the automatic goods inventory unit 200 through the vehicle gateway unit 400 and the communication center 640, and start insurance claim services according to the information situation and send other linkage management information according to emergency plan settings. The other industry management clients support function customization according to the corresponding industry management requirements, or choose to enable or disable the related monitoring client functions within the user permission range.

Figure 7:
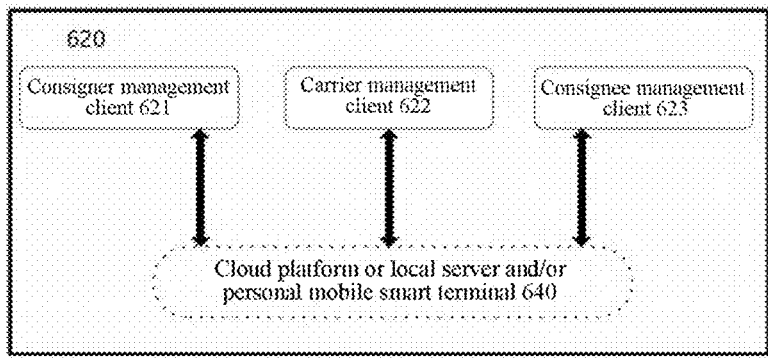
FIG. 7 is a schematic diagram of a composition principle of an enterprise operation management client according to an embodiment of the present invention.

FIG. 7 is a schematic diagram of a composition principle of the enterprise operation management client 620 of the remote management unit 600 of the vehicle goods real-time inventory system in this embodiment.

Based on FIG. 7, the enterprise operation management client 620 of the remote management unit 600 in this embodiment includes a consigner management client 621, a carrier management client 622, and a consignee management client 623 according to different users.

Based on FIG. 1, FIG. 5, and FIG. 7, the consigner management client 621 of the enterprise operation management client 620 is configured to receive and display security tracking and query information of a consignment vehicle.

The carrier management client 622 of the enterprise operation management client 620 is configured to receive and display vehicle goods inventory monitoring and early warning information forwarded by the automatic goods inventory unit 200 through the vehicle gateway unit 400 and the communication center 640; when receiving the early warning and alarm information, send emergency rescue processing information to the driver and passenger service client 630 in the form of text, image, voice, file, etc.; and when receiving an alarm on theft or loss of vehicle goods of a vehicle transporting dangerous goods such as flammable, explosive, highly corrosive, toxic and radioactive goods, send emergency handling information to the driver and passenger service client 630 in the form of text, image, voice, file, etc., and send linkage alarm information immediately and synchronously to the government industry management client 610 according to emergency plan settings.

The consignee management client 623 of the enterprise operation management client 620 is configured to receive and display the security tracking and query information of the consignment vehicle.

Figure 8:
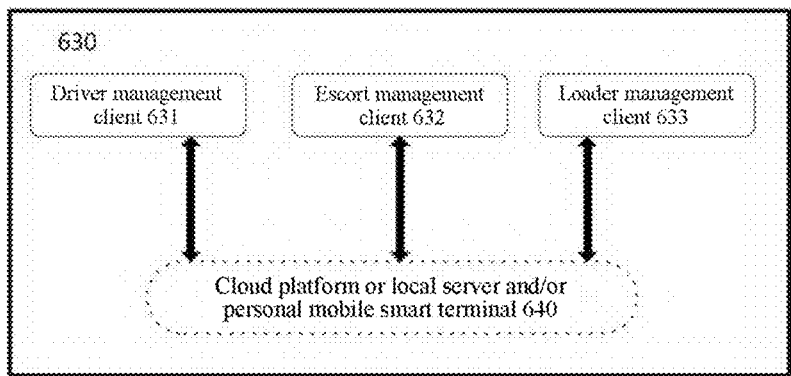
FIG. 8 is a schematic diagram of a composition principle of a driver and passenger service client according to an embodiment of the present invention.

FIG. 8 is a schematic diagram of a composition principle of the driver and passenger service client 630 of the remote management unit 600 of the vehicle goods real-time inventory system in this embodiment.

Based on FIG. 8, the driver and passenger service client 630 of the remote management unit 600 in this embodiment includes a driver service client 631, an escort service client 632, and a loader service client 633 according to different users.

Based on FIG. 1, FIG. 5, and FIG. 6, the driver service client 631 of the driver and passenger service management client 630 is configured to receive the vehicle goods inventory monitoring and early warning information forwarded by the automatic goods inventory unit 200 through the vehicle gateway unit 400 and the communication center 640, and receive and display the emergency handling information sent by the carrier management client 622 in the form of text, image, voice, file, etc., or display the emergency handling information automatically pushed after triggering the related early warning and alarm information. The driver service client herein supports voice broadcast warning information, and supports the feedback on the goods inspection and handling results to the government industry management client and the carrier management client after the driver completes the goods inspection.

The escort service client 632 of the driver and passenger service management client 630) is configured to receive and display the vehicle goods inventory monitoring and early warning information forwarded by the automatic goods inventory unit 200 through the vehicle gateway unit 400 and the communication center 640, and receive and display the emergency handling information sent by the carrier management client 622 in the form of text, image, voice, file, etc., or display the emergency handling information automatically pushed after triggering the related early warning and alarm information. The escort service client herein supports voice broadcast warning information, and supports the feedback of the escort on the goods inspection and handling results to the government industry management client and the carrier management client after the driver completes the goods inspection.

The loader service client 633 of the driver and passenger service management client 630 is configured to receive and display quantity changes and inventory information during loading and unloading of goods uploaded by the automatic goods inventory unit 200, and supports query on the type, quantity, loading and unloading requirements, physical characteristics, chemical characteristics, physical and chemical hazards of the goods currently transported, and corresponding emergency handling information.

Figure 9:
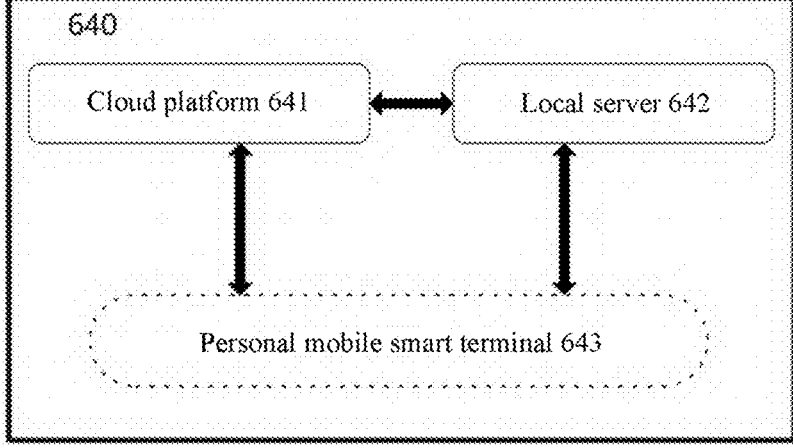
FIG. 9 is a schematic composition diagram of a communication center according to an embodiment of the present invention.

FIG. 9 is a schematic diagram of the communication center 640) in the remote management unit 600 of the vehicle goods real-time inventory system in this embodiment.

Based on FIG. 9, the communication center 640 of the remote management unit 600 in this embodiment includes a cloud platform 641, a local server 642, and a personal mobile smart terminal 643. This embodiment preferably combines communication center application modes of the personal mobile smart terminal 643 of the cloud platform 641, which can be determined according to actual communication conditions of different users, and are not limited herein.

Based on FIG. 1. FIG. 5, and FIG. 9, the cloud platform 641 of the communication center 640 is configured for the storage of the data information and alarm information uploaded by the vehicle gateway unit 400, the shared data resource pool for data reception and call of the government industry management client 610/enterprise operation management client 620/driver and passenger service client 630, the computer hardware platform environment supporting the application of the government industry management client 610/enterprise operation management client 620/driver and passenger service client 630, and the communication interaction between the government industry management client 610/enterprise operation management client 620/driver and passenger service client 630 and the vehicle gateway unit 400. The cloud platform 641 communicates with the vehicle gateway unit 400, receives and stores the vehicle goods inventory monitoring and early warning information forwarded by the automatic goods inventory unit 200 through the vehicle gateway unit 400, and forwards management instructions or response instructions of the government industry management client 610, the enterprise operation management client 620, and the driver and passenger service client 630 to the vehicle gateway unit 400. For example, the cloud platform 641 herein supports B/S monitoring client applications, and the B/S monitoring client is preferably developed based on the latest version of high-security operating system and high-security information innovation browser.

The local server 642 of the communication center 640 is configured for the storage of the data information and alarm information uploaded by the vehicle gateway unit 400, the shared data resource pool for data reception and call of the government industry management client 610/enterprise operation management client 620/driver and passenger service client 630, the computer hardware platform environment supporting the application of the government industry management client 610/enterprise operation management client 620/driver and passenger service client 630, and the communication interaction between the government industry management client 610/enterprise operation management client 620/driver and passenger service client 630 and the vehicle gateway unit 400. The local server 642 communicates with the vehicle gateway unit 400, receives and stores the vehicle goods inventory monitoring and early warning information forwarded by the automatic goods inventory unit 200 through the vehicle gateway unit 400, and forwards management instructions or response instructions of the government industry management client 610, the enterprise operation management client 620, and the driver and passenger service client 630 to the vehicle gateway unit 400. For example, the local server 642 herein supports C/S monitoring client applications, and the C/S monitoring client is developed based on various latest versions of high-security operating systems based on the Linux kernel.

The personal handheld smart terminal 643 of the communication center 640 is configured for the storage of the data information and alarm information uploaded by the vehicle gateway unit 400, the online query tool and temporary storage space of the government industry management client APP 610/enterprise operation management client APP 620/driver and passenger service client APP 630 for uploading data information, the microcomputer hardware platform environment supporting the application of the government industry management client APP 610/enterprise operation management client APP 620/driver and passenger service client APP 630, and the communication interaction between the government industry management client APP 610/enterprise operation management client APP 620/driver and passenger service client APP 630 and the vehicle gateway unit 400.

Further, the personal handheld smart terminal 643 can further communicate with the vehicle gateway unit 400 through the cloud platform 641 or the local server 642, receive and store the vehicle goods inventory monitoring and early warning information forwarded by the automatic goods inventory unit 200 through the vehicle gateway unit 400, and forward management instructions or response instructions or emergency handling information of the government industry management mobile client APP 610/enterprise operation management mobile client APP 620/driver service mobile client APP 630 to the vehicle gateway unit 400. For example, the mobile monitoring client APP herein is preferably developed based on an operating system based on the Linux kernel such as the HarmonyOS microkernel or Android.

During deployment, the remote management unit 640 configured in this way is preferably disposed in a cloud platform of a government industry authority related to vehicle traffic management or operation management and/or a local storage server and/or a personal handheld smart terminal of a related manager, a cloud platform of a vehicle-owned transportation enterprise and a transportation related party and/or a local storage server and/or a personal handheld smart terminal of a related manager, and a personal handheld smart terminal of a driver or a passenger, and is associated with the vehicle gateway unit 400, and indirectly associated with the automatic goods inventory unit 200 and the alarm prompt unit 500 through the vehicle gateway unit 400.

The remote management unit 640 deployed in this way can receive the vehicle goods inventory monitoring and early warning information sent by the vehicle gateway unit, send driver management operation instructions based on the alarm information, send feedbacks to the vehicle gateway unit, and send feedbacks to the alarm prompt unit through the vehicle gateway. The remote management unit deployed in this way supports the adjustment of the inventory cycle, time and information upload frequency of the radio frequency identification (RFDI) card reader of the automatic goods inventory unit through the related monitoring client settings, and pushes the emergency handling information of the transportation of the goods.

The vehicle goods real-time inventory system formed based on the specific scheme in this example can register quantity changes during loading and unloading of goods in real time during running, and perform quantity inventory on transported goods regularly or irregularly. On this basis, the system can comprehensively determine whether goods on a freight vehicle are at risk of being lost. When a detection result or an intelligent analysis result of a monitored object triggers an early warning or alarm, early warning or alarm information is sent to the remote management unit through the network communication module of the vehicle gateway, and a corresponding local early warning acousto-optic or voice prompt is sent through the alarm prompt unit to prompt a driver to stop and check.

Finally, it should be noted that the above-described method of the present invention, or a specific system unit, or some units thereof, may be arranged in a physical medium, such as a hard disk, a CD-ROM, or any electronic device (such as a smartphone, a computer-readable storage medium) through program code. When a machine (such as a smartphone) loads and executes the program code, the machine becomes a device for implementing the present invention. The above-described method and device of the present invention can also be transmitted in program code mode through some transmission media, such as cables, optical fibers, or any transmission mode. When the program code is received, loaded, and executed by a machine (such as a smartphone), the machine becomes a device for implementing the present invention.

The above shows and describes the basic principles, main features, and advantages of the present invention. A person skilled in the art should understand that the present invention is not limited by the above embodiments. The above embodiments and specifications only describe the principles of the present invention. Without departing from the spirit and scope of the present invention, there will be various changes and improvements in the present invention. These changes and improvements fall within the protection scope of the present invention. The protection scope of the present invention is defined by the appended claims and their equivalents.

What is claimed is:

1. A vehicle goods real-time inventory system of a radio frequency identification technology, comprising:

an automatic goods inventory unit, wherein the automatic goods inventory unit registers and generates registration information of quantity changes during loading and unloading of goods, performs quantity inventory on transported goods regularly or irregularly to generate inventory information of transported goods, and transmits registration and inventory information to a vehicle gateway unit or directly to a remote management unit through the vehicle gateway unit;

the vehicle gateway unit, wherein the vehicle gateway unit is respectively connected via the radio frequency identification technology with the automatic goods inventory unit, the alarm prompt unit, and the remote management unit, and establishes a communication channel between the units to complete data exchange; the vehicle gateway unit can complete risk early warning processing according to the corresponding registration and inventory information in cooperation with the automatic goods inventory unit;

the alarm prompt unit, wherein the alarm prompt unit is connected to the vehicle gateway unit, and completes a local alarm on a vehicle and/or completes a remote alarm by connecting with the remote management unit through the vehicle gateway unit; and the remote management unit, wherein the remote management unit is connected via the radio frequency identification technology directly with the vehicle gateway unit, and indirectly with the automatic goods inventory unit and the alarm prompt unit through the vehicle gateway unit; and the remote management unit generates system configuration information and/or emergency handling information; and receives vehicle goods inventory early warning information sent by the vehicle gateway unit.

2. The vehicle goods real-time inventory system according to claim 1, wherein: the automatic goods inventory unit comprises a radio frequency identification card reader disposed at a carriage door, and a radio frequency identification electronic tag disposed on goods packaging;

the radio frequency identification card reader is configured to read the radio frequency identification electronic tag on the goods packaging; and the radio frequency identification electronic tag is pasted on the goods packaging for reading statistics during the loading and unloading of the goods and for real-time inventory statistics during transportation of the goods.

3. The vehicle goods real-time inventory system according to claim 1, wherein: the vehicle gateway unit comprises a network communication module and/or a data storage module and/or an edge computing module;

the network communication module is configured for data exchange between the automatic goods inventory unit and the alarm prompt unit and between the automatic goods inventory unit and the remote management unit;

the data storage module is configured to store goods registration and inventory information uploaded by the automatic goods inventory unit; and the edge computing module is configured for intelligent analysis and determination on the goods registration and inventory information uploaded by the automatic goods inventory unit.

4. The vehicle goods real-time inventory system according to claim 1, wherein: the vehicle gateway unit is directly associated with the automatic goods inventory unit, the alarm prompt unit, and the remote management unit;

when the vehicle gateway unit receives the goods registration and inventory information uploaded by the automatic goods inventory unit and determines through analysis that when a related early warning alarm is triggered, the vehicle gateway unit sends warning information to the alarm prompt unit and sends early warning and alarm information and real-time goods registration and inventory information to the remote management unit; and when receiving an alarm instruction, a voice prompt instruction, or a detector configuration adjustment sent by the remote management unit, the vehicle gateway unit sends alarm instruction and voice prompt instruction information to the alarm prompt unit, and sends a detector configuration related operation to a related detection device of the automatic goods inventory unit.

5. The vehicle goods real-time inventory system according to claim 1, wherein: the alarm prompt unit comprises a vehicle local alarm prompt subunit and a remote monitoring client alarm prompt subunit.

6. The vehicle goods real-time inventory system according to claim 1, wherein:

the remote management unit comprises a government industry management client, an enterprise operation management client, a driver and passenger service client, and a communication center;

the government industry management client is configured to receive and display vehicle goods inventory monitoring and early warning information forwarded by the automatic goods inventory unit of a vehicle transporting flammable, explosive, highly corrosive, toxic and radioactive dangerous goods through the vehicle gateway unit and the communication center, and based on the received early warning and alarm information, send a related management instruction, start an emergency management process, and issue a related emergency handling instruction;

the enterprise operation management client is configured to receive and display vehicle goods inventory monitoring and early warning information forwarded by the automatic goods inventory unit through the vehicle gateway unit and the communication center, and send a related management instruction or emergency rescue guide information based on the received early warning and alarm information; and when the vehicle transports dangerous goods such as flammable, explosive, highly corrosive, toxic and radioactive goods, or other goods that may pose a safety hazard, send emergency alarm information synchronously to the government industry management client;

the driver and passenger service client is configured to receive and display vehicle goods inventory monitoring and early warning information forwarded by the automatic goods inventory unit through the vehicle gateway unit and the communication center, send an acousto-optic alarm, a voice prompt, and emergency handling information corresponding to the alarm warning information based on the received alarm warning information, to prompt a driver to check, and provide a corresponding emergency handling plan; and when the vehicle transports dangerous goods such as flammable, explosive, highly corrosive, toxic and radioactive goods, or other goods that may pose a safety hazard, send emergency alarm information synchronously to the government industry management client; and the communication center is configured to communicate with the vehicle gateway unit, receive and store the vehicle goods inventory monitoring and early warning information forwarded by the automatic goods inventory unit through the vehicle gateway unit, and forward the information respectively to the government industry management client, the enterprise operation management client, and the driver and passenger service client.

7. The vehicle goods real-time inventory system according to claim 1, wherein: the remote management unit is disposed in a cloud platform of a government industry authority related to vehicle traffic management or operation management and/or a local storage server and/or a personal handheld smart terminal of a related manager, a cloud platform of a vehicle-owned transportation enterprise and a transportation related party and/or a local storage server and/or a personal handheld smart terminal of a related manager, and a personal handheld smart terminal of a driver or a passenger, and is associated with the vehicle gateway unit, and indirectly associated with the automatic goods inventory unit and the alarm prompt unit through the vehicle gateway unit.

8. The vehicle goods real-time inventory system according to claim 3, wherein: the vehicle gateway unit is directly connected with the automatic goods inventory unit, the alarm prompt unit, and the remote management unit;

when the vehicle gateway unit receives the goods registration and inventory information uploaded by the automatic goods inventory unit and determines through analysis that when a related early warning alarm is triggered, the vehicle gateway unit sends warning information to the alarm prompt unit and sends early warning and alarm information and real-time goods registration and inventory information to the remote management unit; and when receiving an alarm instruction, a voice prompt instruction, or a detector configuration adjustment sent by the remote management unit, the vehicle gateway unit sends alarm instruction and voice prompt instruction information to the alarm prompt unit, and sends a detector configuration related operation to a related detection device of the automatic goods inventory unit.

* * * * *